United States Patent
Preston et al.

(10) Patent No.: US 6,569,540 B1
(45) Date of Patent: May 27, 2003

(54) DIMENSIONALLY STABLE WOOD COMPOSITES AND METHODS FOR MAKING THEM

(75) Inventors: Alan F. Preston, Charlotte, NC (US); David A. Fowlie, Concord, NC (US); Kevin J. Archer, Charlotte, NC (US)

(73) Assignee: Chemical Specialties, Inc., Charlotte, NC (US)

( * ) Notice: Subject to any disclaimer, the term of this patent is extended or adjusted under 35 U.S.C. 154(b) by 0 days.

(21) Appl. No.: 09/550,027

(22) Filed: Apr. 14, 2000

(51) Int. Cl.$^7$ .............................................. B32B 21/04
(52) U.S. Cl. ........................ 428/537.1; 524/13; 524/14; 524/16
(58) Field of Search ........................ 428/537.1; 524/13, 524/14, 16

(56) References Cited

U.S. PATENT DOCUMENTS

| | | | |
|---|---|---|---|
| 3,617,436 A | * 11/1971 | Sundasen et al. | 162/72 |
| 3,874,990 A | 4/1975 | Surdyk | |
| 4,020,180 A | * 4/1977 | Woerner | 424/294 |
| 4,039,645 A | 8/1977 | Coyle | 264/118 |
| 4,104,374 A | 8/1978 | Reuther et al. | 424/185 |
| 4,232,067 A | 11/1980 | Coleman | 428/17 |
| 4,241,133 A | 12/1980 | Lund et al. | 428/326 |
| 4,376,088 A | 3/1983 | Prather | 264/109 |
| 4,404,252 A | 9/1983 | Hetzler et al. | 428/326 |
| 4,532,161 A | 7/1985 | Collins et al. | 427/440 |
| 4,539,235 A | 9/1985 | Collins et al. | 427/440 |
| 4,622,248 A | 11/1986 | Leach et al. | 427/440 |
| 4,643,860 A | 2/1987 | Knudson et al. | 264/109 |
| 4,831,959 A | 5/1989 | Turner | 118/303 |
| 4,937,143 A | * 6/1990 | West | 427/419.8 |
| 5,067,536 A | 11/1991 | Liska et al. | 144/361 |
| 2002/0084548 A1 | 7/2002 | Randall et al. | |

OTHER PUBLICATIONS

ACQ®–C sheet, Chemical Specialties, Inc. (Sep., 1999).
American Wood–Preservers Association Standard P5–97 "Standard for Waterborne Preservatives", p. 7 (1997).
American Wood–Preservers Association Standard P5–97 " Standard for Waterborne Preservatives", pp. 9–14 (1999).
CSI Material Safety Sheet, Chemical Specialties, Inc. (date unknown) 8 pages.
Hall, et al., Weatherability of Phenolic–Bonded Ghanaian Hardwood Flakeboard Made From ACA–Treated Flakes, *Forest Products Journal* 29(*12*):34–38 (Dec. 1979).
Hall, et al., "Preservative treatment effects on mechanical and thickness swelling properties of aspen waferboard," *Forest Products Journal* 32(*11/12*):19–26 (Nov./Dec. 1982).
Hall, et al., "Subtropical testing of ACA–treated hardwood particleboard," *Forest Products Journal*, 37(*4*):49–53 (Apr., 1987).
Okoro, et al., Influence of natural durability, laboratory weathering, resin content, and ammoniacal copper arsenate treatment on the decay resistance of African hardwood particleboards.
Schmidt, et al., "Biodeterioration and strength reductions in preservative treated aspen waferboard," *Forest Products Journal* 33(*11/12*):45–53 (Nov./Dec. 1983).
Schmidt, et al., "Assessment of preservative treated aspen waferboard after 30 months of field exposure," *Forest Products Journal* 37(*2*):62–66 (Feb. 1987).
Schmidt, et al., "Pilodyn Evaluation of Treated Waferboard in Field Exposure," *Wood and Fiber Science* 20(*1*):18–21 (1988).
Viitanen, "Preservation of wooden boards," Forest Products Laboratory—Technical Research Centre of Finland 327, Espoo, 59 pages (Dec., 1984).

* cited by examiner

Primary Examiner—Edward J. Cain
(74) *Attorney, Agent, or Firm*—McAndrews, Held & Malloy, Ltd.

(57) ABSTRACT

The invention is a wood composite including wood particles, a binder, at least one wood stabilizer, and optionally other ingredients. Examples of the wood stabilizer are an ammoniacal wood stabilizer or ammoniacal copper dimethyl glyoxime. The wood stabilizer is present in an amount effective to reduce the swelling value of the wood composite to less than that of an analogous wood composite not treated with the wood stabilizer. A method for making wood composites and the product of that method are also disclosed. The method includes providing green wood particles and applying to them a wood stabilizer as described above, preferably without an intervening drying step. It is contemplated that the wood stabilizer can be applied in an amount effective to at least substantially preserve the resulting wood composite against at least one of rot, termites, and carpenter ants. While or after applying the stabilizer, a water repellant material is applied to the wood particles. The treated wood particles are then formed into a wood composite.

39 Claims, No Drawings

DIMENSIONALLY STABLE WOOD COMPOSITES AND METHODS FOR MAKING THEM

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

This invention relates to dimensionally stabilized wood composite products such as agglomerated structural board, oriented strandboard, medium density fiberboard, particleboard, and structural members such as posts, poles, beams or corrugated plates and moldings. The invention also relates to methods of manufacturing these wood composite products from wood particles. "Wood particles" is defined broadly in this specification to include wood strands, chips, flakes, refined chips or flakes, fibers, webs of splintered wood formed by twisting or crushing billets of wood, or other forms of wood particles. The invention further relates to a wood preservative that also improves the dimensional stability of the treated wood when the wood is exposed to a moist or humid environment.

Various types of structural members, such as utility poles, guard rails, fence and sign posts, building beams, construction pilings, railroad ties, and the like, are commonly made from solid wood. Solid wood is subject to increasing production costs, the limited supply of trees of suitable species and size, and more economically efficient uses of solid wood for other purposes. There is a growing need for a substitute wood composite material from which the above and other types of structural members can be made. In addition, there is a need for substitutes for plywood, as in residential sheathing.

The use of wood residues and surplus wood of low commercial value for making wood composite is quite desirable because of the vast supply and the lower, more stable cost of this source of wood. To be capable of being used for the same applications, the resulting structural members should have properties, particularly strength properties, which meet or exceed those of solid wood.

Wood composite products are well known. Wood composites are in widespread use in furniture and other consumer products. Some examples of specific wood composite products are particleboard, medium density fiberboard (MDF), and oriented strandboard (OSB).

Particleboard is formed by binding small wood flakes with an adhesive, then rolling or molding a billet or sheet of the treated flakes to form a board, beam, or other product form. Randomly oriented particleboard has different mechanical properties from ordinary sawn timber wood. Wood exhibits directional mechanical properties, owing to the natural alignment of long wood fibers along the direction of the tree trunk. Its tensile strength and elastic modulus, for example, are much greater in directions parallel to the grain direction than in the cross-grain direction. In contrast, the random alignment of wood flakes in particleboard and some other wood composite products results in substantially isotropic mechanical properties. But these isotropic properties are comparable to the relatively poor mechanical properties possessed by wood in directions perpendicular to the grain. In general, particleboard has exhibited a poor ability to sustain bending loads, as compared with natural timber, and thus has largely been unsatisfactory as a structural beam.

Medium density fiberboard is made similarly to particleboard, except that the flakes commonly are smaller, and are refined to release fibers before forming sheets.

More recently, wood composite products have been developed in which wood flakes or strands are oriented in a single direction, to provide a structure more like natural wood. One example is oriented strandboard. Such products possess relatively improved strength in directions parallel to the direction of alignment.

Also, more complex wood composite products have been developed, having several consolidated strata in which the particles are aligned in different directions. For example, a three-stratum beam or sheet or other composite article can be made in which the outer or facing layers have their orientation parallel to the longest dimension of the composite, as in conventional wood. The interior layer has its fiber orientation perpendicular to the longest dimension of the composite. Three-stratum boards are also known in which large flakes make up the center layer and smaller flakes make up the outer layers.

One problem with wood composite products is that they are dimensionally unstable after they are made. Even a stratified board with layers oriented in different directions will grow or shrink substantially in response to environmental moisture and weather conditions. This property has limited the value of wood composite members of substantial size for use in construction products.

The problem of dimensional instability can be addressed by increasing the adhesive content of the product, but at a substantially greater cost, as the adhesive composition is expensive.

Another way to improve the dimensional moisture stability of the resulting board product is to apply a suitable wax in emulsion or molten form to the wood particle mix at the binder blender station or elsewhere in the fabrication process. This approach reduces the problem, but the dimensional stability of the wood composite may still be deficient.

Other problems that must be addressed by wood composite products in some environments include preservation against one or more of termites, ants (for example, carpenter ants) and other wood-destroying insects or fungi, soft rot, and mold fungi. Examples of wood-destroying fungi and soft rot and mold fungi are: *Gloeophyllum trabeum, Trametes versicolor, Paxillus panuoides, Condrostereum purpurescens, Heterobasidium annosum, Bispora effusa, Stachybotrys atra, Chaetomium globosum, Trichoderma viride, Aspergillus niger,* Hormiscium spec., and Stemphylium spec. Wood products are preserved using amounts of wood preservative compounds known or believed to be effective against one or more of these organisms.

Yet another problem in the art has been how to effectively incorporate a water-borne wood preservative in a wood composite product, so the preservative compounds reach the interior of the product, without also incorporating a significant amount of additional water in the product. Any excess incorporated water must be dried out, using additional energy, time, equipment, factory space, and thus money. Another problem in the art is how to incorporate a water-borne preservative system into wood composite products without causing a negative impact on panel structural properties.

U.S. Pat. No. 4,241,133, issued to Lund, et al., discloses a wood composite containing about 5 to 12 weight % of a binder and, optionally, additives, such as wax, for waterproofing and preservatives for protection against decay fungi and insects. According to Lund, dried, classified particles are introduced into a conventional blender where predetermined amounts of a binder, and optionally a wax, a preservative and other additives are applied to the particles as they are tumbled or agitated in the blender.

Lund discloses that when the structural member is to be used for long-term exterior applications, a preservative for protecting the wood against attacks by decay fungi and insects can be added to the wood particles during or before the binder blending step. According to Lund, any preservative which is compatible with the adhesive system can be used, such as pentachlorophenol, creosote, chromated copper arsenate, ammoniacal copper arsenate and the like. Lund reports that effective amounts of such preservatives, up to about 5% by weight, can be added to the wood particles without producing an appreciable reduction in the structural strength of the resulting structural member. Lund states that the loss in strength is about the same as solid wood treated with the same preservatives.

Lund indicates that the binder, wax and other additives can be added separately or in any sequence or in combined form. U.S. Pat. No. 4,404,252, issued to Hetzler et al., discloses that powdered phenol formaldehyde resin and molten slack wax can be applied simultaneously to the particles in a dry blender.

Lund discloses that particles from some green woods can contain up to 90% moisture. Accordingly, Lund dries the particles to about 3 to about 20 weight % or less moisture, based on the dry weight of the particles, before further processing. This drying step expends a substantial amount of energy. Similarly, U.S. Pat. No. 4,376,088, issued to Prather, discloses that the moisture content of the particles suitably may range from about 0 to about 24 percent by weight.

U.S. Pat. No. 4,622,248, issued to Leach, et al., discloses a preservative composition for solid wood products. The composition of Leach includes an aqueous ammoniacal solution of a preservative metal compound and an organic acid. The acid is selected from the group consisting of aliphatic dicarboxylic acids containing 2–10 carbon atoms per molecule, aliphatic mono, di- or tricarboxylic hydroxy acids containing 2–6 carbon atoms per molecule or a mixture of these acids and/or their salts.

Leach discloses that before impregnating timber with any wood treating solution it is essential to season the timber until at least all the free water has been removed from the cell spaces. This stage of seasoning represents a moisture content of about 25%-30%, varying slightly with different species. Leach identifies two reasons for this requirement. First, Leach states that it is not possible to inject another liquid into solid wood containing much water. Second, Leach states that splits developing as the result of the subsequent drying of the timber would almost certainly expose untreated timber.

Each of the patents identified above is incorporated here by reference to provide background and contribute to the best mode, enablement, and written description of this disclosure, and particularly to disclose how to make wood composite products.

BRIEF SUMMARY OF THE INVENTION

One aspect of the invention is a wood composite including wood particles, a binder, at least one wood stabilizer, and optionally other ingredients. The wood stabilizer is selected from an ammoniacal wood stabilizer, a metal/dimethyl glyoxime stabilizer, and combinations of those stabilizers. The wood stabilizer is present in an amount effective to reduce the moisture-induced swelling of the composite to less than that of an analogous wood composite not treated with the wood stabilizer. The stabilizer desirably is present in an amount and form recognized in the industry as effective to preserve the wood. But the present invention is not limited to uses in which the wood is effectively preserved. Also, "preservation" is used broadly in this specification to refer to any treatment which reduces the rate of deterioration of a wood composite, compared to the rate of deterioration of an analogous wood composite lacking the preservative.

Another aspect of the invention is a stabilized wood composite made by contacting wood particles with an ammoniacal stabilizer, and at the same time or later with a water repellant.

Another aspect of the invention is a method for making wood composites. The method includes providing wood particles and applying to them a wood stabilizer as identified above, in an amount effective: (1) to reduce the degree of swelling of the wood composite in the presence of moisture; (2) to at least substantially preserve the resulting wood composite against at least one of rot, fungi, termites, or other wood-destroying organisms; or (3) both. While or after applying the stabilizer, a water repellant material is applied to the wood particles. The treated wood particles are then formed into a wood composite.

Yet another aspect of the invention is a stabilized wood composite made by the method described above.

A surprising advantage of the present invention is that the addition of certain treatment agents substantially improves the dimensional stability of the wood in the presence of moisture, increasing its value and the number of applications for which it is suited.

Another advantage of the present invention is that the same treatment that improves the dimensional stability of the wood can also preserve it against deterioration. Thus, two important benefits are gained in a single treatment while manufacturing the wood composite.

Yet another advantage of the invention is that the wood stabilizer can be applied to green wood particles, without pre-drying them. Thus, time, money, and energy can be saved.

BRIEF DESCRIPTION OF THE SEVERAL VIEWS OF THE DRAWING

Not applicable.

DETAILED DESCRIPTION OF THE INVENTION

While the invention will be described in connection with one or more embodiments, it will be understood that the invention is not limited to those embodiments. On the contrary, the invention includes all alternatives, modifications, and equivalents as may be included within the spirit and scope of the appended claims.

The process of the invention will now be described in more detail. The process, particularly as adapted to making oriented strandboard, broadly includes the following steps. It should be understood, however, that the present invention is also applicable to other wood composites that are made in various ways.

As a first step in making oriented strandboard, wood flakes are provided. Wood flakes can be prepared from various species of suitable hardwoods and softwoods. Representative examples of suitable woods include aspen, maple, elm, fir (such as balsam fir, Douglas fir, or white fir), pine (such as red pine, sugar pine, southern pine, or ponderosa pine), cedar, spruce, locust, beech, birch, and mixtures thereof. Many other wood species may also be used, individually or in combinations.

Small logs, branches or rough pulp wood are comminuted into flake-like particles, individual splinters, a web of connected splinters, refined flakes, or similar forms. These forms are all defined in the present specification and claims as "particles" for the sake of simplicity, since the present process can be carried out similarly for each of these forms. Optionally, the flakes can be refined to release fibers, as when making medium density fiberboard.

The wood particles can be prepared by various conventional techniques. For example, debarked pulpwood grade logs, or so-called roundwood, can be converted into particles in one operation with a conventional roundwood flaker. Alternatively, logs, logging residue, saplings, etc. can be cut into fingerlings in the order of 0.5 to 3.5 inches (1 to 9 cm.) long with a conventional device, such as a helical comminuting shear, and the fingerlings flaked in a conventional ring-type flaker. The woods are normally debarked prior to flaking.

In addition, milling, planing, sanding, sawing, or other wood processing waste can be processed into suitable wood particles. These particles made from processed woods may already be classified adequately in size to avoid the need for classification as outlined above.

For best results with oriented wood composite products, the wood flakes should have an average length of from about 0.5 inch to about 5 or 6 inches (1–15 cm). The flakes can alternatively be about 1 inch to about 2 inches (3–5 cm) long. The flakes can have an average thickness of about 0.01 to about 0.05 inch (0.25 to 1.25 mm), alternatively about 0.015 to about 0.025 inch (0.38 to 0.63 mm), alternatively about 0.02 inch (0.5 mm). Flakes longer than about 3.5 inches (9 cm) may tend to curl which hinders proper alignment during mat formation, and it is difficult to insure that flakes shorter than about 0.5 inch (1 cm) do not become aligned with their grain direction cross-wise. Flakes thinner than about 0.01 inch (0.25 mm) tend to require excessive amounts of binder to obtain adequate bonding, and flakes thicker than about 0.05 inch (1.3 mm) are relatively stiff and tend to require excessive compression to obtain the desired intimate contact between them. In any given batch, some of the flakes generally will be shorter than 0.5 inch (1 cm) or longer than 6 inches (15 cm). The same is true for the width and thickness of the flakes. The size of the flakes is not regarded as critical, and the flake size may deviate from the above-stated sizes without departing from the scope of the invention. In particular, fibers having dimensions smaller than those provided above are commonly used for manufacturing medium density fiberboard. Particleboard is made from flakes having major dimensions of about 0.5 to 1 inch (12–25 mm) and a thickness of about 0.01 to 0.015 inch (0.25–0.4 mm).

To facilitate proper alignment in oriented wood composites like OSB, the flakes can be several times as long as they are wide, for example, about 4 to about 10 times as long. Using this constraint as a guide, the average width of the flakes generally can be from about 0.1 to about 2.5 inches (2.5 to about 64 mm), alternatively from about 0.1 to about 0.5 inch (2.5 to 13 mm), and their average thickness can be about 0.015 to about 0.025 inch (0.38 to 0.63 mm). In one embodiment, elongated wood flakes can be provided predominantly having a grain direction extending generally parallel to their respective longitudinal axes. The flakes can have an average length of about 0.5 inch to about 5 or 6 inches (1–15 cm), an average length to average width ratio of about 4:1 to about 10:1, and an average thickness of about 0.01 to about 0.05 inch (0.25 to 1.25 mm). Again, these numbers are typical, but not critical to practicing the present invention. Non-oriented products like particleboard and medium density fiberboard can be made from more compact flakes that can be about as wide as they are long.

The wood particles of oriented wood composite products can be assembled or maintained as one or more strata or layers. In a layer, the particles can have a grain direction extending generally parallel to the machine direction—the direction of travel of wood through the process. In one oriented strandboard embodiment contemplated here, at least 90% of the wood particles are oriented in the recited manner.

The present inventors have discovered that green wood particles having a high moisture content can usefully be employed in the present process, which eliminates or materially reduces the need, and thus the cost, of pre-drying the particles. The fiber saturation point of wood, at which the fibers are saturated with water, is generally considered to be about 30% moisture content (based on dry wood weight), dependent on species. The moisture content of green wood particles commonly exceeds the fiber saturation point. The present wood stabilizers, whether used for stabilizing wood, preserving it, or both, work at moisture contents both below or above the fiber saturation point. Thus, the present method can be carried out using either the dried particles of the prior art or particles containing any amount of moisture, including moisture levels characteristic of green flakes.

The moisture content of the green wood particles just before treatment with a stabilizer may be at or above the saturation point of the wood, alternatively on the order of from about 30% to about 100% by weight (based on the weight of dry wood), alternatively from about 40% to about 100% by weight. The moisture content may optionally be from about 60% to about 80% by weight, optionally from about 50% to about 70% by weight, based on the weight of dry wood. Moisture contents outside these ranges that result in wood having improved dimensional stability are also contemplated. In contrast, the moisture content to which the particles are dried traditionally has been in the order of from about 20 weight % to about 3 weight % or less, based on the dry weight of the particles.

If necessary or desired in a given instance, the particles can be partially dried prior to classification to prevent them from sticking together, thus assisting classification, or to provide other benefits. The chips nonetheless can be classified and used when they are very moist, and while they still meet one of the moisture content ranges contemplated above for the present invention.

The flakes or fibers (i.e. particles) are then blended with a stabilizer, a liquid wax composition, a suitable binder, and optionally other additives. Optionally, the stabilizer is applied first. Desirably, the stabilizer-treated particles are held for at least 1–2 hours to allow time for diffusion of the stabilizer into the particles. The holding time will depend on the particle thickness, moisture content and temperature. After the hold time the particles are dried to a low moisture content, typically less than 5%, in an oven and sprayed with the binding resin and wax. The resultant mixture of particles, or furnish, is formed into a loosely felted, layered mat (single or multi-layered), which may be made continuously in a roller process or as discrete billets in a molding process. Sufficient pressure (with or without heat) is applied to the mat by a roller, press, or other means to compress it to the desired thickness and shape for the structural member being made and to bond the wood particles together.

Various wood stabilizer compositions are contemplated for use in the present invention. The inventors have found that ammoniacal stabilizers (stabilizers containing or made from ammonia, ammonium hydroxide, or other ammonium compounds) are particularly useful for improving the dimensional stability of the resulting wood composite product. Without being bound by or limiting their invention according to the accuracy of their theory, the inventors presently believe that the ammonia constituent of the stabilizer may be responsible for the improved dimensional stability of the wood. Ammonia has the ability to relax internal stresses produced in the particles by the manufacturing process. The ammonia may also contribute to binder resin crosslinking or provide other beneficial effects. Consequently, ammonia or ammonium salts, per se, are regarded in this specification as ammoniacal stabilizers, whether or not they also contain wood preserving ingredients.

A more specific stabilizer composition contemplated here, which also functions as a preservative, is an ammoniacal stabilizer including a preservative metal. The preservative metal can be, for example, copper, zinc, or compounds and mixtures of those metals. Copper metal has proven particularly useful, being both effective and environmentally safe. When copper or zinc are used they may be incorporated into the system as a metal compound or metal salt such as a metal oxide, metal hydroxide, metal carbonate, metal sulfate, or as the metal itself provided a suitable oxidizing agent such as air, hydrogen peroxide or nitric acid is present. These metal compounds are normally insoluble in water but can be solubilized in the presence of ammonia and/or ammonium compounds. Ammoniacal copper complexes are contemplated to be useful stabilizers, and also have utility as wood preservatives.

The ammoniacal metal stabilizer can further contain an organic acid. The organic acid can be selected from one or more straight chain, aliphatic dicarboxylic acids containing 2–10 carbon atoms per molecule, optionally 2–6 carbon atoms. The organic acid can be selected from aliphatic monocarboxylic acids and hydroxycarboxylic acids containing 2–6 carbon atoms per molecule. The organic acid can be selected from aliphatic dicarboxylic hydroxy acids containing 2–6 carbon atoms per molecule. The organic acid can be selected from aliphatic tricarboxylic hydroxy acids containing 2–6 carbon atoms per molecule. The organic acid can be provided as a salt. The organic acid can be selected from mixtures of compounds from any one or more of the above categories. For example, the organic acid can be oxalic acid, citric acid, acetic acid, propionic acid, hexanoic acid, adipic acid, or combinations of those.

The ammonia-containing compound should be capable of solubilizing the preservative metal, metal compounds or mixtures, when used in an effective amount. The ammonia-containing compound can be ammonia or an ammonium salt, for example, ammonium carbonate, ammonium bicarbonate, ammonium sulfate, ammonium acetate, other ammonium carboxylate salts, or combinations thereof. A mixture of ammonia and an ammonium salt is contemplated, as well.

It is desirable that the weight of the ammonium hydroxide (as 30% $NH_3$) present be at least 1.75 times the weight of the copper, expressed as the metal. Desirably, the weight of the ammonium compounds such as ammonium carbonate and/or ammonium bicarbonate present, if required, should be at least 0.5 times the weight of the copper expressed as the metal. These ratios may vary, but there must be sufficient ammonia present to complex the metal. Moreover, it is desirable to have the amount of ammonia present in the system in excess of that required to complex the metal to insure stability of the stabilizer concentrate and treating solution.

The pH of the stabilizer solution can be between about 9–12 and alternatively between 10.5–11.5. At pH's less than about 9, the stabilizer concentrate and treating solution may become unstable and form a precipitate during storage or during the treatment process.

The composition can have a molar ratio of organic acid to metal between about 0.1 and about 4 depending upon the preservative effect desired.

One preservative contemplated for carrying out the present invention can be obtained from Chemical Specialties, Inc., Charlotte, N.C., after the filing date of this specification, under the trademark COMPSOL™.

More generally, a stabilizer contemplated for carrying out the present invention is copper ammonium carbonate (CAC)—a known composition. CAC can be prepared, for example, by adding 61 parts by weight of copper metal to 150 parts by weight of water containing 100 parts by weight of 30% ammonium hydroxide and 70 parts by weight of ammonium bicarbonate. The mixture is agitated and aerated until all of the copper metal is dissolved.

Another example of the stabilizer composition comprises the following nominal constituents in weight percent: citric acid about 11%, copper about 7%, ammonia about 16%, carbon dioxide about 3% and the balance water. Yet another example is oxalic acid about 14%, copper about 7%, ammonia about 16%, carbon dioxide about 2% and the balance water. Another specific example of such a stabilizer is copper ammonium acetate. One suitable nominal composition of copper ammonium acetate is 8% by weight copper, 6.3% by weight ammonia and 24% by weight acetic acid.

Another useful preservative that improves the dimensional stability of wood is a metal complex of dimethyl glyoxime, for example, ammoniacal copper dimethyl glyoxime copper dimethyl glyoxime. Complexes of the other preservative metals previously mentioned may also be employed. Ammoniacal copper arsenate (ACA) is also contemplated for use herein, providing it is used in an environment where its arsenic content is not a problem.

Still other useful stabilizers contemplated here include ammoniacal copper borate, ACZA (ammoniacal copper zinc arsenate), ammoniacal copper naphthenate, ammonia, or ammonium salts.

A preservative is usually applied to a substrate in a quantity sufficient to produce a desired preservative end point and thus, actual quantities may vary broadly. In general, an effective preservative treating solution will contain from about 0.1% to about 15% by weight of preservative metal salts, alternatively up to about 12% by weight of the preservative metal per se, depending upon the strength of the salt selected. More commonly this range will vary from between 0.5% to about 10% based on the preservative metal salt content. Most of the above-noted stabilizers, in particular the ammoniacal copper or zinc stabilizers, also function as wood preservatives when used in an appropriate amount.

The desired level of stabilizer retention will likewise depend on several factors such as method of application, geographic location, species of wood, etc. However, it is generally recommended that retention be maintained from between about 0.1 to 7 lbs. of preservative salts per cubic foot of wood (pcf) (1.6 to 112 Kg/m$^3$). Alternatively, this range will be from about 0.1 to about 5 pcf (1.6 to 80 Kg/m$^3$). Alternatively, this range will be from about 0.125 to about 0.6 pcf (2 to 9.6 Kg/m$^3$). Alternatively, this range will be from about 0.25 to about 2.5 pcf (4 to 40 Kg/m$^3$), alternatively from about 0.25 to about 0.4 pcf (4 to 6.4 Kg/m$^3$).

Other additives, such as coloring agents, fire retardants and the like may also be added to the particles before, during, or after the stabilizer blending step.

It is useful, after treating the particles with the stabilizer, to allow the particles to remain in contact with the treatment solution to give the stabilizer time to penetrate into the particles. This step is particularly contemplated if the particles are green and thus retain a substantial proportion of water. Contact time allows exchange between the water in the particles and the water containing the preservative and stabilizer, allowing diffusion of preservative salts and stabilizing ingredients into the particles. At least an hour of contact time is contemplated, though more or less contact time may be useful in given circumstances.

Optionally, the particles may be dried to remove the moisture present in the green particles and added during the addition of the wood stabilizer and optionally other ingredients. The particles can be dried as necessary to leave roughly 3% by weight of moisture, compared to the weight of dry wood in the particles. Drying the particles only after the stabilizer is added reduces the total amount of drying required.

The moisture resistance of the structural member can be improved by spraying a liquid wax emulsion onto the particles during or after the stabilizer blending step. The wax can be, for example, the aliphatic or paraffinic petroleum product commonly known as slack wax. Slack wax is the wax recovered from a petroleum hydrocarbon by either solvent or propane dewaxing, and can contain entrained oil in an amount varying up to about 50%, alternatively 35% oil. This is the first waxy material separated in the refining of crude oil.

Molten or emulsified wax is applied to the particles. The amount of wax added generally is about 0.5 to about 5 weight %, as solids, based on the dry weight of the particles. Alternatively, the amount of wax can be at least about 1% of the oven dry weight of the wood particles. Alternatively, the amount of wax can be at least about 2% of the oven dry weight of the wood particles. The wax or other water repellant may be added after the stabilizer or with the stabilizer, but preferably is not added before the stabilizer. It is contemplated that adding the stabilizer no later than the water repellant allows the stabilizer to penetrate deep into the particles, before the water repellant excludes it.

In one contemplated embodiment, the wood particles are treated with the stabilizer, then with the wax, then dried.

In another contemplated embodiment, the water repellant and stabilizer are formulated together in an emulsion having the water repellant in the non-aqueous phase and the stabilizer in the aqueous phase. In such an emulsion, the inventors contemplate the aqueous phase will be the wood stabilizer, in substantially its usual concentration in water for application as an aqueous solution, and the non-aqueous phase will be the waxy component of the slack wax, in substantially its usual form. The resulting emulsion will have approximately the same proportions of aqueous and non-aqueous phases as the slack wax emulsion conventionally employed.

It is within the skill of this art to adjust the proportions of phases in the wax/stabilizer emulsion to account for the salting out effect of the stabilizer salts on the emulsion. It is also within the skill of this art to adjust proportions of ingredients and incorporate emulsifiers and other adjuvants to produce a stable emulsion. An emulsion can readily be formulated and used to deliver appropriate amounts of the wood stabilizer predominantly to the interior of the particles and of the water repellant predominantly to the outsides of the particles.

One advantage of employing a wax emulsion, as opposed to molten slack wax, is that a given volume of the emulsified wax is dispersed in a larger volume of liquid. It is contemplated that the dispersed wax can be more evenly distributed over the wood particles than can be accomplished using molten wax. It is also contemplated that the application of the wax emulsion to wet wood particles, slowing the rate of absorption of the emulsion (and particularly the water it contains), also will improve coverage by allowing more time for the wax emulsion to be evenly distributed over the wood particles. Thus, the currently common 40–50% coverage of wood particles with wax can be increased, providing more consistent water repellant character than is usually achieved at present.

The next step in the process is the application of a suitable binder or adhesive to bind the wood particles together. Suitable binders include those used in the manufacture of oriented strandboard, particleboard, fiberboard, and other chemical wood particle bonding systems. Resinous oriented strandboard binders presently are preferred. Representative examples of suitable binders include thermosetting resins such as phenolic, phenol-formaldehyde, resorcinol-formaldehyde, melamine-formaldehyde, urea-formaldehyde, urea-formaldehyde-melamine, urea-furfural and condensed furfuryl alcohol resins. Other resins may also be utilized.

The particular type of binder used depends primarily upon the intended use for the structural member. For instance, structural members made with urea-formaldehyde resins have sufficient moisture durability for many uses that involve minimal exposure to moisture, but generally cannot withstand extended outdoor exposure. Phenol-formaldehyde and melamine-formaldehyde resins provide the structural member with durable properties required for long-term exterior applications.

The amount of binder admixed with the wood particles can conveniently be about 3 to about 12 weight %, as solids, based on the dry weight of the wood particles.

The binder can be admixed with the particles in either dry or liquid form. To maximize coverage of the particles, the binder can be applied by spraying droplets of the binder in liquid form onto the particles as they are being tumbled or agitated in a blender. A web of loosely consolidated particles can be dipped through a bath of the binder or sprayed with the binder. The binder may also be introduced into a mold, preceded or followed by insertion of a charge of particles to be bound together in the mold. Foaming techniques may be applied to foam the resin to assist in spreading the resin and to fill any voids that might occur between the particles, while minimizing the amount of water employed in the process or taken up by the particles.

Any processing equipment can be used to prepare the treated wood particles. For example, the particles can be circulated in a rotating drum mixer and sprayed with the stabilizer, wax, and binder using one or more Coil spinning disc atomizers.

The particles are formed by suitable apparatus into a generally flat, loosely-felted mat, having one or more layers, and the mat is placed in a suitable press and compressed to consolidate the wood particles into a structural member of the desired size and cross-sectional shape. For example, the particles can be deposited on a plate-like carriage carried on an endless belt or conveyor from one or more hoppers spaced above the belt in the direction of travel. When a multi-layered mat is formed, a plurality of hoppers is used with each having a dispensing or forming head extending across the width of the carriage for successively depositing a separate layer of the particles as the carriage is moved beneath the forming heads.

The process can be carried out on a batch basis, i.e. individual sheets of the wood composite can be molded by treating an appropriate volume of particles with the binder resin combination and heating and pressing the treated material. Alternatively, the process can be carried out in a continuous manner by feeding treated particles in the form of a continuous web or mat through a heating and pressing zone defined by upper and lower continuous steel belts, through which the necessary heat and pressure are applied.

The mat thickness will vary depending upon such factors as the size and shape of the wood particles, the particular technique used in forming the mat, the desired thickness and density of the structural member or component, and the pressing pressure used. The mat thickness usually is about 5 to 6 times the final thickness of the structural member or component. For example, for a structural component having a 1-inch (2.5 cm.) thickness and a density of about 40 lbs/ft$^3$ (0.64 g/cm$^3$), the mat usually will be about 5–6 inches (about 13–15 cm) thick. If the mat is thicker than about 25–30 inches (64–76 cm), it usually must be partially precompressed to a reduced thickness, with rollers or the like, prior to introduction into the press.

Pressing temperatures, pressures, and times vary widely depending on the thickness and the desired density of the structural member or component, size and type of wood particles, moisture content of the particles, and the type of binder. The pressing temperature used is sufficient to at least partially cure the binder and expel water from the mat within a reasonable time period, without charring the wood. Generally, a pressing temperature ranging from ambient (for room temperature-curable binders) up to about 450° F. (230° C.) can be used. Temperatures above 450° F. (230° C.) can cause charring of the wood particles. A pressing temperature of about 350° F. (175° C.) to about 425° F. (220° C.) is generally preferred for phenol-formaldehyde resin binders.

The pressure should be sufficient to press the wood particles into intimate contact with each other without crushing them to the point causing a breakdown of fibers with a resultant degradation in structural integrity. The pressure usually is about 325 to about 500 psig (224 to 345 N/cm$^2$).

The pressing time is sufficient to partially cure the binder to a point where the structural member or component has sufficient integrity for handling. The press cycle typically is about 2 to about 20 minutes; however, longer times can be used when pressure-curing binders are employed or when more complete curing of thermosetting binders is desired.

The pressed boards may be cooled, stacked to allow time and air circulation, and sanded to uniform smoothness and thickness, as is conventional.

One effective workable resin/wax level and press temperature/duration is as follows:

| | |
|---|---|
| Treatment | Green flakes - dried after stabilizer treatment to 4–5% moisture content (MC) oven dry basis |
| Preservative Retention | 0.60 pcf (9.6 kg/m$^3$) copper ammonium carbonate (CAC) based on species SG |
| Resin | 2.3% by weight Liquid PMF (Phenolic melamine formaldehyde) core and face |
| Wax | 1.0% solids slack wax |
| Panel thickness | ½ inch (1.27 cm) |
| Panel density | 41 pcf (0.66 g/cm$^3$) |
| Press temp | 380° F. (193° C.) |
| Press time | 5 minutes |

The inventors have the following theory respecting how the copper ammonium carbonate is retained in the treated wood. The invention is not limited by this theory, and the validity of this patent does not turn on the accuracy of this theory. According to this theory, the copper component in the copper ammonium carbonate fixes to the wood through one or more of: (1) ion exchange reactions which take place between the cupric complex cations and acidic functional groups such as the carboxylic acid groups of lignin and hemicellulose, (2) complexation with cellulose through hydrogen bonding with hydroxyl or nitrogen groups, (3) replacement of an amine functionality from the copper ion complex with the hydroxyl ion of cellulose, or (4) formation of insoluble copper carbonate salts resulting from the loss of ligands during drying and pressing.

Dimensional Stability Testing

The dimensional stability of wood is its ability to retain its dry dimensions after extended contact with water. It is measured by determining the dimensions of the wood before and after soaking it in water or otherwise exposing it to moisture, as in a humid environment.

Advantages of the Invention

There are several significant benefits to using the present invention in phenol-formaldehyde bonded oriented strandboard (OSB) and other wood composites. These include enhanced stabilization through reduced thickness swell. Internal bond values are marginally increased, as are the modulus of rupture (MOR) and modulus of elasticity (MOE) properties of treated panels. Resistance to Formosan subterranean termite attack is significantly improved over conventional untreated OSB, as is resistance to fungal decay, particularly in above ground applications. Improvements in stability and physical properties of the panels can be realized with a preservative retention equivalent to 0.3–0.96 or more pcf (4.8–15 or more Kg/m$^3$) copper ammonium carbonate. Where maximum decay and termite resistance is paramount the retention of the preservative desirably is not less than 0.96 pcf (15.4 Kg/m$^3$) copper ammonium carbonate equivalent.

The swelling value of the stabilizer-treated wood according to the present invention is about 15%, alternatively about 20% or less, alternatively about 23% or less, alternatively about 26% or less, alternatively about 30% or less, alternatively about 36% or less, alternatively about 40% or less, alternatively about 41% or less, alternatively about 45% or less, alternatively about 47% or less, alternatively about 50% or less, alternatively about 55% or less, alternatively about 58% or less, alternatively about 59% or less, alternatively about 60% or less, alternatively about 61% or less, alternatively about 62% or less, alternatively about 63% or less, alternatively about 64% or less, alternatively about 66% or less, alternatively about 67% or less, alternatively about 70% or less, alternatively about 74% or less, alternatively about 75% or less, alternatively about 77% or less, alternatively about 80% or less, alternatively about 85% or less, alternatively about 90% or less, alternatively about 92% or less, of the swelling value of an analogous wood composite not treated with the wood stabilizer.

WORKING EXAMPLES

The following examples are provided to illustrate the invention and how it may be made and used by a person skilled in the art. The invention, however, is not limited to the disclosed or preferred embodiments provided here.

Example 1

A CAC stabilizer composition is made containing 24.1% by weight copper ammonium carbonate and 75.9% of inert ingredients. This preservative has a metallic copper equivalent of 8% by weight and a copper oxide (CuO) equivalent of 10% by weight. The above preservative composition is dissolved in ammonia to give an aqueous solution within the pH range of 8–11. The weight of ammonia is at least as great as the weight of copper oxide. To aid in solution the treating solution contains carbonate anion. The amount of carbonate, expressed as $CO_2$, is at least 0.25 times the amount of copper oxide on a weight basis. The copper ammonium carbonate content of the treating solution can be from about 20% to about 28% by weight. The applicable standard analytical procedures of the American Wood Preservers' Association can be used to determine these values.

The composition of the treating solution may deviate outside the limits specified above. In that case the preservative retention in treated material is desirably determined by assay and the retention so determined is at least 0.60 pcf (9.6 Kg/m$^3$), and at least 0.96 pcf (15 Kg/m$^3$) for maximum termite and decay resistance of the treated wood. These retentions are expressed in terms of copper ammonium carbonate equivalent.

Example 2

Thick strands of aspen combined with a portion of pine and birch, up to 35 thousandths of an inch thick, were obtained from Potlatch, Grand Rapids, Minn. These strands were treated with sufficient treatment solution made according to Example 1 and allowed a sufficient holding time to provide a preservative retention level of 0.6 pcf (9.6 Kg/m$^3$). The strands were dried after treatment to 4–5% moisture content (MC). The treated strands were made into OSB panels using a 24-inch (61-cm) square press, using the conditions specified in Table 1.

The test results for these samples are provided in Table 1. Table 1 shows that the internal bonds (IB's) of the copper ammonium carbonate (CAC) treated material are equivalent to those of the untreated panels. The thickness swell and water absorption numbers were much lower in the CAC treated panels than in the untreated material.

Example 3

This example was carried out similarly to Example 2. However, strands from the same source were bonded with two levels of an acid catalyzed phenol melamine formaldehyde resin system (Liquid PMF) in the core and face. Internal bond (IB), thickness swell, water absorption, modulus of rupture (MOR) and modulus of elasticity measurements were made using ASTM D1037 and APA D4 protocols. The conditions specified in Table 2 were used.

The results from this second experiment are presented in Table 2. Table 2 shows that the IB values for the CAC treated panels with the acid catalyzed resin system were higher than the untreated controls. The data appear to indicate that increasing the resin loading from 4–6% improves the IB value. Similarly the MOR and MOE values for the CAC treated material were superior to those measured on the untreated panels. Of greater significance is the fact that the CAC treatment improved the thickness swell and water absorption values as compared to the untreated control. The CAC treatment has the potential to provide major improvements in edge swelling and water absorption without impacting internal bond strength of the panels.

Example 4

Samples of LP manufactured lap siding and resin coated overlaid CAC treated siding material were evaluated for their compatibility with edge sealants. LP siding is siding made by Louisiana-Pacific Corporation, Portland, Oreg. (though Louisiana-Pacific's current product was not used in these tests). LP siding is a wood composite product made from wafers of wood that are coated in resin and then formed into a mat. A resin-impregnated overlay is placed over the mat, which is then pressed into panels under heat and pressure. The panels are then cut into boards to make lap siding. Edge sealant materials are used on composites to minimize water pickup on any exposed edges.

A standard test was used for evaluating edge sealant performance: the "sponge test." In this test a wet sponge was set up along the edge of a test specimen for up to 96 hours. Measurements of weight gain from water pick up and swelling were made at 24 hour intervals and compared with the reference control material. CAC treated siding was tested with and without an edge sealant. The results were compared to commercially sourced LP siding material pretreated with the edge sealant in the normal course of manufacture.

The treatment conditions and results after 96 hours exposure are summarized in Table 3. The results indicate that the CAC treatment reduced edge swelling relative to the edge sealed control by a considerable margin. The addition of the edge sealant did not appear to provide any benefit to the performance of the CAC treated panels.

Example 5

CAC treated material was challenged in an outdoor field exposure situation that more closely simulated eventual end usage of the product. The edge swelling characteristics of CAC treated OSB were evaluated using a number of different tests installed at a field test site located in Hilo, Hi. Hilo is recognized internationally by the wood preservation industry as an area that presents an extreme above ground decay hazard to forest products due to the high annual rainfall, in excess of 160 inches (406 cm), and year round average temperatures which range from 75–85° F. (24–29° C.). These conditions are extreme for promoting fungal decay and termite attack.

The edge swelling performance of CAC treated OSB (0.6 pcf, 9.6 Kg/m$^3$) was evaluated using a fully exposed simulated decking test. Test samples 1 inch (2.5 cm)×8 inch (20 cm)×nominal ½ inch (1.3 cm) board thickness were exposed horizontally on aluminum metal racks 18 inches (46 cm) above the ground for a period of six months. Untreated phenol formaldehyde (PF) bonded controls were included in the test. At the end of the three-month exposure period, thickness measurements were made at multiple locations along the edges of the samples using a digital caliper. The average thickness values for all the test specimens are summarized in Table 4. The data show that the untreated PF bonded control material swelled much more (37.9% average of 2 samples) than the 0.6 pcf, 9.6 Kg/m$^3$ CAC material (22.3% average of 10 samples).

Example 6

The edge swelling behavior of CAC treated OSB was evaluated after 6 months exposure using samples installed in a ground proximity test set up located in Hilo, Hi. 50×125 mm (2 inch×5 inch) test samples were placed with one major surface facing down, supported on concrete blocks resting directly on soil. The blocks and samples were then covered with a horticultural shade cloth supported on a 1×6 inch (2.5×15 cm) stabilizer treated frame. The porous shade cloth permitted the passage of visible light and ultraviolet light (UV) and water from rainfall. In addition the concrete blocks wicked water from the underlying soil. This test set up is typically used for decay test purposes and represents a decay hazard intermediate between full ground contact exposure and a fully exposed decking simulation test. CAC treated (0.6pcf, 9.6 Kg/m$^3$ CAC) material and an untreated PF bonded control were included in the test. Other conditions of the test are summarized in Table 5.

At the end of the three-month exposure period, thickness measurements were made at multiple locations along the edges of each sample using a digital caliper, then averaged for each panel. The average thickness values for all the test specimens are summarized in Table 5. The data show that the untreated PF bonded control material swelled 32.2% (average of 2 samples), while the 0.6 pcf CAC material swelled only 24.8% (average of 10 samples).

Example 7

The durability characteristics of CAC treated OSB were determined after exposure of test specimens in the above-ground simulated decking test procedure previously described. The treatment conditions and results after 3 and 7 months exposure in Hilo, Hi. are presented in Table 6. The performance of untreated PF bonded and 0.6 pcf (9.6 Kg/m$^3$) CAC treated material can be compared at the two sampling periods.

The initial bending strength of the sample material was determined from matching material cut from the same boards before the test samples were installed in the field. The data indicate that the initial bending strength of the CAC treated material was higher than that of both untreated controls. After 3 months of exposure the residual strength of the CAC and untreated PF resin controls had dropped to approximately 89% of their original values. However, after 7 months the untreated PF had deteriorated considerably to 48% of its original bending strength. The CAC treated material remained at 80% of its original strength, indicating the value of the CAC treatment in protecting the panel from decay and weathering. These factors are well known for their negative impacts on board strength characteristics.

Example 8

The performance of CAC treated lap siding was evaluated alongside a commercially sourced lap siding product at two test sites; one in Gainesville, Fla., the other in Hilo, Hi. To carry out this test, resin coated overlay lap siding was manufactured from CAC treated (0.96 pcf, 15 Kg/m$^3$) aspen strands. Panels were fabricated using the parameters described previously, summarized in Table 7. The nominal panel size was 4 feet (122 cm)×8 feet (244 cm) and the target thickness was 7/16 inch (1.1 cm), set using mechanical stops. The target panel density was 39 pcf (0.62 g/cm$^3$). The press platen temperature was controlled at 400° F. (204° C.) and the total press time was 5.5 minutes. Before pressing, a resin-coated overlay (Dyno) was laid over the mat, along with a wood grain embossing plate similar to that used commercially. The press schedule was as follows:

Starting pressure 600 psi (414 N/cm$^2$)
Reduce to 300 psi (207 N/cm$^2$) at 1.5 minutes
Reduce to 100 psi (69 N/cm$^2$) at 4.5 minutes
Reduce to 50 psi (34 N/cm$^2$) at 5 minutes
De-gas at 5 psi (3 N/cm$^2$) until press open at 5.5 minutes All panels were hot stacked for 24 hours to complete the bonding of the phenolic resin.

The 4 foot (122 cm)×8 foot (244 cm) panels were ripped into 8 inch (20 cm) wide strips and the edges were beveled to resemble commercial 8 inch (20 cm) lap siding. An edge sealant was used on half the boards. Test siding material was shipped to the two test sites and used to fabricate a north and south facing wall structure. The wall structure was supported on a 4 foot×6 foot (122 by 183 cm) rectangular plywood panel itself supported on treated 4 inch×4 inch×8 foot (10 cm by 10 cm by 244 cm) posts.

The edge thickness of each individual siding piece was measured at four marked positions along the drip edge and in corresponding positions on what would become a protected edge. Siding pieces were attached to the plywood backing using electro-galvanized screws. A roof cap was fabricated to protect the panels from direct rainfall immediately above the assemblies. Finally, the flat surfaces were painted with two coats of high quality latex-based house paint.

At each inspection the siding samples were removed from the plywood by unscrewing the fasteners. Measurements of the edge thickness were taken at the marked positions on each edge.

Results at different assessment periods are presented in Table 7 for Gainesville Fla. and in Table 8 for Hilo, Hi.

The data in Table 7 show that after 12 months the swelling on the drip edge of CAC treated material in non-sealed panels was approximately half that of the commercially sourced lap siding. The difference was not so great between the edge sealed samples, but the CAC treated material still showed superior swelling characteristics when compared to the commercial material.

The Hilo data reported in Table 8 are even more remarkable. After 7 months the edge swelling of the CAC treated material was approximately one third of the untreated control siding. A final measurement was taken after 75 months exposure at which time the untreated commercial samples were so destroyed by decay that it was not possible to take any thickness measurements. In contrast, after 75 months (and close to 1000 inches—2540 cm—of rain) the CAC treated panels were completely free from decay and the edge swelling was no greater than 10% of the original board thickness.

Example 9

Copper ammonium carbonate treated Aspen oriented strandboard (OSB) panels were evaluated for their efficacy against pure cultures of standard decay fungi using the American Wood Products Association (AWPA) E10 soil block test protocol. In this test small (19 mm×19 mm×board thickness) cubes were leached for 14 days in deionized water, dried and then exposed to pure cultures of *Gloeophyllum trabeum, Irpex lacteus, Postia placenta* and *Coriolus versicolor* for 12 weeks. Efficacy in a soil block test is determined from weight loss measurements. Results comparing the efficacy of CAC treated, untreated isocyanate and untreated PF bonded control material exposed to the four fungi are presented in Table 9. The data indicate that CAC treated OSB controls *Gloeophyllum trabeum* successfully at a retention of 0.60 pcf (9.6 Kg/m$^3$) (copper ammonium carbonate equivalence). The performance of CAC against copper tolerant *Postia placenta* and *Irpex lacteus* is superior to that of untreated phenol formaldehyde (PF) bonded OSB.

Example 10

Copper ammonium carbonate treated OSB was tested in direct soil contact at a field site in Hilo, Hi. using stakes (Board thickness×25 mm) tested under the AWPA E7 protocols. Performance data for untreated controls, copper ammonium carbonate treated stakes and stakes treated with reference preservatives such as CCA Type C, Zinc Borate and Disodium Octaborate are provided in Table 10. The results indicate that copper ammonium carbonate provided long-term protection against decay and insect attack in OSB material.

Copper ammonium carbonate, applied according to the present invention, has also proven effective in a variety of other tests of efficacy of wood preservatives in a variety of environments.

Example 11

A moist southern yellow pine particleboard furnish (18% MC based on oven dry weight) was treated with CAC stabilizer concentrate at an addition rate equivalent to 0.6 pcf (9.6 Kg/m$^3$) CAC in the finished panel product (target density 48 pcf, 0.77 g/cm$^3$). The treated furnish was allowed to sit for 2 hours prior to drying to facilitate diffusion of the active ingredient and to simulate the green bin dwell time in a typical particleboard mill. Once dry, urea formaldehyde resin and a wax emulsion were blended with the treated furnish using a Coil spinning disk atomizer. The furnish was then formed into mats and pressed into panels. The blending and pressing parameters used are listed below:

| | |
|---|---|
| Resin addition rate | 9% face; 7% core |
| Wax addition rate | 1% face; 1% core |
| Face to core ratio | 40% face; 60% core |
| Panel dimensions | 21 inches × 21 inches |
| Target thickness | ¾" |
| Target density | 48 pcf (0.77 g/cm$^3$) |
| Press temperature | 340° F. (171° C.) |
| Press cycle time | 10 minutes + 30 seconds de-gas |

The mechanical and physical properties of the resultant panels are summarized in Table 11. All testing was performed according to ASTM and APA protocols. The water absorption and swelling properties of the test panels were extremely low relative to typical commercially sourced particle board (18–20% water absorption, 10–11% thickness swell).

Example 12

Medium density fiberboard (MDF) was made as follows. Air dry mixed hardwood fiber was sprayed with CAC stabilizer concentrate using a Coil spinning disk atomizer in a blender to achieve a CAC retention of 0.6 pcf (9.6 Kg/m$^3$) in the finished board. The CAC moistened fiber was dried to a moisture content suitable for pressing (3–5%) and then blended with resin and wax. After the resin and wax addition the furnish was formed into mats and pressed into ½ inch (1.3 cm) thick panels. The actual blending and pressing parameters were as follows:

| | |
|---|---|
| Resin type | Liquid phenolic |
| Resin addition rate | 8.0% |
| Wax Type | Liquid emulsion |
| Wax addition rate | 1.0% |
| Panel dimensions | 21 inches × 21 inches (53 cm by 53 cm) |
| Target density | 50 pcf (0.8 g/cm$^3$) |
| Press temperature | 380° F. (193° C.) |
| Press cycle time | 6 minutes |

The thickness swelling characteristics of CAC treated MDF were measured after a four hour soak. The results are summarized in Table 12. This test shows that the CAC treatment imparted a significant improvement in the thickness swell properties of MDF.

Example 13

To demonstrate the efficacy of ammoniacal copper dimethyl glyoxime and copper ammonium acetate as wood preservatives, a ground proximity termite test was carried out. Wood composite test panels were treated during manufacture with these two preservatives, providing the retentions indicated in Table 13. The test panels were exposed for 12 months in Hilo, Hi. in proximity to the ground, in contact with *Coptotermes formosanus* (Formosan subterranean termites). The test panels were then rated for termite damage on a scale of 0 to 4, where 0 represents completely sound wood and 4 represents wood that has been completely destroyed. The results are provided in Table 13. The control panel that was not treated was completely destroyed at the end of the test, while the panels treated with the respective preservatives showed little damage.

Example 14

Aspen OSB test panels containing the retentions of ammoniacal copper dimethyl glyoxime and copper ammonium acetate indicated in Table 14, as well as an untreated control, were subjected to a ground contact performance test in Hilo, Hi. The test was carried out to measure the degree of decay observed for treated versus untreated panels. The degree of decay was rated on a 0 to 100 soundness scale, with 100 representing no decay and 0 representing complete decay. The results at three different exposure times are presented in Table 14. As Table 14 shows, both ammoniacal copper dimethyl glyoxime and copper ammonium acetate preserved the wood effectively under conditions which completely decayed the untreated wood after 32 months.

Example 15

Aspen OSB test panels containing the retentions of ammoniacal copper dimethyl glyoxime and copper ammonium acetate indicated in Table 15, as well as an untreated control, were subjected to mechanical and swell testing. Two internal bond (IB) tests were run: one on the panel as manufactured ("initial") and the other on a similar panel boiled in water for two hours before testing, as an accelerated test to simulate exposure to moist conditions. The results are reported in Table 15. The initial IB values for the treated panels were lower than the untreated panels, but the reverse was true for the panels after two hours in boiling water. After this moisture exposure, the panels treated according to the present invention had higher internal bond strength than the same types of panels not treated with a stabilizer. The strength retentions of the treated panels were higher (and thus better) than that of the untreated panel. The thickness swell value was substantially lower for the treated panels than for the untreated panel, showing that both ammoniacal copper dimethyl glyoxime and copper ammonium acetate are effective as stabilizers to reduce swelling of the test panels.

Example 16

To demonstrate the efficacy of ammoniacal copper dimethyl glyoxime and copper ammonium acetate as wood stabilizers, a ground proximity termite test was carried out. Wood composite test panels were treated with these two preservatives during manufacture, providing the retentions indicated in Table 16. The test panels were exposed for 3 months in Hilo, Hi. in proximity to the ground, and swelling was measured by comparing the thickness of each panel at the beginning of the test to its thickness after one month and after three months. The results are presented in Table 16. The test panel having a retention of 2 kg/m$^3$ copper dimethylglyoxime only performed in Hawaii about as well as the control, but the copper dimethylglyoxime and copper ammonium acetate at a higher retention (4 kg/m$^3$) both proved effective to stabilize the test panels.

The same test was carried out at a test site in North Carolina. The results are provided in Table 17. In this test, the panels having a retention of 2 kg/m$^3$ copper dimethylglyoxime were more effective than the control after three months, thus demonstrating the efficacy of this treatment level to improve the dimensional stability of a wood composite.

TABLE 1

IB, Thickness Swell, Water absorption - from laboratory panels

| Measurement | Untreated | Copper ammonium carbonate (CAC)Treated (0.60 pcf, 9.6 Kg/m$^3$ CAC) |
|---|---|---|
| IB (psi) | 38 | 39 |
| IB (N/cm$^2$) | 26 | 27 |
| Thickness swell (%) | 23.8 | 14.5 |
| Water absorption (wt. %) | 55.7 | 40.3 |
| Resin | 2.3% powdered phenol-formaldehyde (PF) core and face | |
| Wax | 1.0% solids of a 58% emulsion | |
| Panel thickness | ½ inch (1.3 cm) | |
| Panel density | 40 pcf (0.64 g/cm$^3$) | |
| Press temp | 400° F. (204° C.) | |
| Press time | 5 minutes | |
| Number of samples | 20 for internal bond (IB), 9 for water absorption and thickness swell (WATS) | |

TABLE 2

IB, MOR, MOE, Thickness Swell of laboratory panels

| Measurement | Untreated (4% resin) | CAC treated (4% resin) | CAC Treated (6% resin) |
|---|---|---|---|
| IB (psi) | 48.5 | 57.4 | 65.3 |
| (N/cm$^2$) | 33.4 | 39.6 | 45.0 |
| MOR (psi) | 2750 | 3082 | 4226 |
| (N/cm$^2$) | 1896 | 2125 | 2914 |
| MOE (psi) | 550,000 | 594,340 | 675,850 |
| (N/cm$^2$) | 379,000 | 410,000 | 466,000 |
| Thickness swell (%) | 23.8 | 15.2 | 6.2 |
| Water absorption (%) | 42.8 | 38.1 | 20.0 |

TABLE 2-continued

IB, MOR, MOE, Thickness Swell of laboratory panels

| Measurement | Untreated (4% resin) | CAC treated (4% resin) | CAC Treated (6% resin) |
|---|---|---|---|
| Flake species | Aspen + percentage of pine and birch strands | | |
| Treatment | Wet - dried after treatment to 4–5% MC oven dry basis | | |
| Retention | 0.60 pcf (9.6 Kg/m$^3$) CAC based on species SG | | |
| Resin | Liquid PMF (Phenolic melamine formaldehyde) core and face | | |
| Wax | 1.0% solids slack wax | | |
| Panel thickness | ½ inch (1.2 cm) | | |
| Panel density | 41 pcf (0.65 g/cm$^3$) | | |
| Press temp | 380° F. (193° C.) | | |
| Press time | 5 minutes | | |
| Number of samples | 20 for internal bond, 9 for WATS | | |

TABLE 3

Edge swell performance Sponge test
Resin Coated embossed Overlay OSB panels

| Treatment | Edge seal | Attribute | 24 h | 48 h | 72 h | 96 h |
|---|---|---|---|---|---|---|
| Control | yes | % Swelling | 11.4 | 13.8 | 14.4 | 15.7 |
| | | % Weight gain | 8.72 | 12.18 | 13.24 | 13.44 |
| CAC | yes | % Swelling | 1.7 | 2.8 | 3.8 | 5.7 |
| | | % Weight gain | 0.48 | 0.76 | 1.6 | 1.87 |
| CAC | no | % Swelling | 2.3 | 2.9 | 3.7 | 4.6 |
| | | % Weight gain | 0.52 | 0.71 | 0.81 | 0.78 |
| Treatments | | 0.60 pcf (9.6 Kg/m$^3$) CAC and untreated commercially sourced controls | | | | |
| # replicates | | 3 | | | | |
| Wood flake species | | Aspen | | | | |
| Flake MC | | 70% | | | | |
| Resin | | liquid phenolic 4.0% solids based on oven dry weight | | | | |
| Wax emulsion loading | | 1% solids | | | | |
| Panel size | | 4' × 4' (122 cm × 122 cm) | | | | |
| Panel Thickness | | ½" set with mechanical stops | | | | |
| Target density | | 41 pcf (0.65 g/cm$^3$) | | | | |

TABLE 4

Field swelling
Above ground Horizontal exposed decking test
Hilo, HI (6 months exposure)

| Treatment | Panel | Mean % swell | S.D. |
|---|---|---|---|
| CAC 0.60 pcf (9.6 Kg/m$^3$) | A1 | 20.5 | 1.8 |
| CAC 0.60 pcf (9.6 Kg/m$^3$) | A2 | 15.4 | 5.2 |
| CAC 0.60 pcf (9.6 Kg/m$^3$) | A3 | 21.1 | 6.8 |
| CAC 0.60 pcf (9.6 Kg/m$^3$) | A4 | 26.9 | 2.8 |
| CAC 0.60 pcf (9.6 Kg/m$^3$) | A5 | 31.1 | 5.7 |
| CAC 0.60 pcf (9.6 Kg/m$^3$) | A6 | 19.8 | 4.4 |
| CAC 0.60 pcf (9.6 Kg/m$^3$) | A7 | 19.3 | 3.2 |
| CAC 0.60 pcf (9.6 Kg/m$^3$) | A8 | 19.0 | 4.8 |
| CAC 0.60 pcf (9.6 Kg/m$^3$) | A9 | 22.2 | 2.3 |
| CAC 0.60 pcf (9.6 Kg/m$^3$) | A10 | 28.6 | 10.3 |
| Untreated PF | C6 | 45.9 | 5.7 |
| Untreated PF | C5 | 30.8 | 3.7 |
| Test material | Aspen OSB | | |
| Sample size | ½" × 1" × 8" (1.3 cm × 2.5 cm × 20 cm) cut from 4'×4' (122 cm × 122 cm) panels | | |
| Treated panel retention | 0.6 pcf (9.6 Kg/m$^3$) CAC | | |
| Exposure | Hilo, HI horizontal above ground exposed | | |
| Wood flake species | Aspen | | |
| Flake MC | 70% | | |

TABLE 4-continued

Field swelling
Above ground Horizontal exposed decking test
Hilo, HI (6 months exposure)

| Treatment | Panel | Mean % swell | S.D. |
|---|---|---|---|
| Resin | liquid phenolic 4.0% solids based on strand oven dry weight | | |
| Controls | phenol formaldehyde (PF) resin bonded controls | | |
| Wax emulsion loading | 1% solids | | |
| Panel Thickness | ½" (1.3 cm), set with mechanical stops | | |
| Target density | 41 pcf (0.66 g/cm$^3$) | | |

TABLE 5

Field swelling
Ground proximity test
Hilo, HI (six months exposure)

| Treatment | Panel | Mean % Swell | S.D. |
|---|---|---|---|
| 0.60 pcf, 9.6 Kg/m$^3$ CAC | A1 | 18.4 | 4.7 |
| 0.60 pcf, 9.6 Kg/m$^3$ CAC | A2 | 21.0 | 7.3 |
| 0.60 pcf, 9.6 Kg/m$^3$ CAC | A3 | 21.6 | 2.5 |
| 0.60 pcf, 9.6 Kg/m$^3$ CAC | A4 | 33.7 | 4.9 |
| 0.60 pcf, 9.6 Kg/m$^3$ CAC | A5 | 29.3 | 5.3 |
| 0.60 pcf, 9.6 Kg/m$^3$ CAC | A6 | 24.6 | 6.1 |
| 0.60 pcf, 9.6 Kg/m$^3$ CAC | A7 | 20.9 | 6.2 |
| 0.60 pcf, 9.6 Kg/m$^3$ CAC | A8 | 20.6 | 4.0 |
| 0.60 pcf, 9.6 Kg/m$^3$ CAC | A9 | 22.1 | 5.4 |
| 0.60 pcf, 9.6 Kg/m$^3$ CAC | A10 | 36.5 | 6.9 |
| untreated PF | C6 | 39.6 | 9.4 |
| untreated PF | C5 | 24.9 | 11.2 |
| Exposure | Ground proximity test Hilo, HI | | |
| Sample size | 50 × 125 mm (2" × 5") | | |
| Wood flake species | Aspen | | |
| Flake MC | 70% | | |
| Resin | liquid phenolic 4.0% solids based on oven dry weight | | |
| CAC retention | 0.6 pcf, 9.6 Kg/m$^3$ CAC | | |
| Control treatment | phenol formaldehyde (PF) bonded controls | | |
| Wax emulsion loading | 1% solids | | |
| Panel Thickness | ½" (1.3 cm), set with mechanical stops | | |
| Target density | 41 pcf (0.66 g/cm$^3$) | | |

TABLE 6

Durability retention
Field Exposure
Hilo, HI

| Treatment | Original strength (psi) (N/cm$^3$) | Exposure time 3 months | 7 months |
|---|---|---|---|
| CAC, 0.60 pcf, 9.6 Kg/m$^3$ | 348.43 psi 240 N/cm$^2$ | 309.91 (88.95)[1] (84) | 258.94 |
| Untreated PF resin | 262.32 psi 181 N/cm$^2$ | 234.18 (89.2) | 126.84 (48) |
| Sample size | ½" × 1" × 8" (1.3 cm × 2.5 cm × 20 cm) cut from 4' × 4' (122 cm × 122 cm) panels | | |
| No. of replicates | 10 | | |
| Wood flake species | Aspen | | |
| Flake MC | 70% | | |
| Resin | liquid phenolic 4.0% solids based on oven dry weight | | |
| Treated panel retention | 0.6 pcf, 9.6 Kg/m$^3$ CAC | | |
| Control treatments | PF bonded controls | | |
| Wax emulsion loading | 1% solids | | |
| Panel Thickness | ½" (1.3 cm), set with mechanical stops | | |

TABLE 6-continued

Durability retention
Field Exposure
Hilo, HI

| Treatment | Original strength (psi) (N/cm$^3$) | Exposure time 3 months | 7 months |
|---|---|---|---|
| Target density | 41 pcf (0.66 g/cm$^3$) | | |
| Exposure | Hilo, HI. | | |

[1]Standard deviations are in parentheses

TABLE 7

Edge Swell performance of flat overlaid siding
Gainesville, FL - South facing material

| Treatment | Edge seal | Edge Location | Mean Edge Swell Performance (%) (3 months) | (7 months) | (12 months) |
|---|---|---|---|---|---|
| Untreated control | No | Protected | 2.3 (1.6)[1] | 3.9 (2.5) | 4.5 (3.0) |
| Untreated control | No | Drip | 14.2 (2.7) | 14.4 (4.0) | 20.9 (4.6) |
| Untreated control | Yes | Protected | 6.1 (3.4) | 3.6 (1.3) | 6.4 (4.6) |
| Untreated control | Yes | Drip | 11.5 (6.6) | 13.2 (5.3) | 19.8 (6.8) |
| CAC, 0.96 pcf, 15.4 Kg/m$^3$ | No | Protected | 4.4 (3.1) | 4.1 (1.7) | 6.0 (2.5) |
| CAC, 0.96 pcf, 15.4 Kg/m$^3$ | No | Drip | 8.6 (2.1) | 9.0 (1.9) | 9.8 (2.2) |
| CAC, 0.96 pcf, 15.4 Kg/m$^3$ | Yes | Protected | 2.5 (2.2) | 2.3 (1.8) | 4.2 (1.8) |
| CAC, 0.96 pcf, 15.4 Kg/m$^3$ | Yes | Drip | 10.6 (5.7) | 9.8 (3.2) | 12.5 (5.4) |
| Installation | Gainesville, FL | | | | |
| Sample size | 7/16" × 8" × 4' (1.1 cm × 20 cm × 122 cm) siding cut from 4' × 8' (122 cm × 244 cm) panels | | | | |
| Sample Configuration | Horizontal lap siding, embossed resin coated overlay Multiple Latex paint coats to exterior surface | | | | |
| No. of replicates | 5 North facing; 5 South facing | | | | |
| Wood flake species | Aspen | | | | |
| Flake MC | 70% | | | | |
| Resin | liquid phenolic 4.0% solids based on oven dry weight; isocyanate | | | | |
| Wax emulsion loading | 1% solids based on oven dry weight | | | | |
| Panel Thickness | 7/16" (1.1 cm), set with mechanical stops | | | | |
| Target density | 41 pcf (0.66 g/cm$^3$) | | | | |

[1]Standard deviations are in parentheses

TABLE 8

Edge Swell performance of flat overlaid siding
Hilo, HI

| Treatment | Edge seal | Mean Edge Swell Performance (%) (Drip edge relative protected edge) (3 months) | (7 months) | (75 months) |
|---|---|---|---|---|
| Untreated control | No | 5.46 | 13.5 | Destroyed |
| Untreated control | Yes | 6.29 | 10.5 | Destroyed |
| 0.96 pcf, 15.4 Kg/m$^3$ CAC | No | 2.99 | 3.12 | 10.6 |
| 0.96 pcf, 15.4 Kg/m$^3$ CAC | Yes | 2.56 | 2.74 | 9.7 |
| Installation | Gainesville, FL | | | |
| Sample size | 7/16" × 8" × 4' (1.1 cm × 20 cm × 244 cm) siding cut from 4' × 8' (122 cm × 244 cm) panels | | | |

TABLE 8-continued

Edge Swell performance of flat overlaid siding
Hilo, HI

| | |
|---|---|
| Sample Configuration | Horizontal lap siding, embossed resin coated overlay, Multiple paint coats to exterior surface |
| No. of replicates | 5 North facing; 5 South facing |
| Wood flake species | Aspen |
| Flake MC | 70% |
| Resin | liquid phenolic 4.0% solids based on oven dry weight; Commercial sourced overlaid lap siding |
| Wax emulsion loading | 1% solids based on oven dry weight |
| Panel Thickness | 7/16" (1.1 cm), set with mechanical stops |
| Target density | 41 pcf, 0.66 g/cm$^3$ |

TABLE 9

Evaluation of the efficacy of CAC treated OSB using a soil block test

| Preservative | Retention | Fungus | Mean Weight loss (%) |
|---|---|---|---|
| Copper ammonium carbonate | 0.60 pcf, 9.6 Kg/m$^3$ CAC | G. trabeum | 3.97 |
| Copper ammonium carbonate | 0.60 pcf, 9.6 Kg/m$^3$ CAC | I. lacteus | 34.88 |
| Copper ammonium carbonate | 0.60 pcf, 9.6 Kg/m$^3$ CAC | P. Placenta | 41.81 |
| Copper ammonium carbonate | 0.60 pcf, 9.6 Kg/m$^3$ CAC | C. versicolor | 2.32 |
| Untreated phenol formaldehyde | 0 | G. trabeum | 43.97 |
| Untreated phenol formaldehyde | 0 | I. lacteus | 44.93 |
| Untreated phenol formaldehyde | 0 | P. Placenta | 45.11 |
| Untreated phenol formaldehyde | 0 | C. versicolor | 50.65 |

| | |
|---|---|
| Procedure | AWPA E10 soil block test |
| Fungi tested | Gloeophyllum trabeum, Irpex lacteus, Postia placenta and Coriolus versicolor |
| Exposure time | 12 weeks |
| Leaching | Yes |

TABLE 10

Ground contact stake test
CAC treated OSB
Hilo, HI

| | | Percent Soundness | | | | |
|---|---|---|---|---|---|---|
| Treatment | Retention (kg/m$^3$) | 8 months | 12 months | 19 months | 31 months | 43 months |
| DDAC | 4 | 75 | 70 | 17.5 | 0 | 0 |
| DDAC | 6.4 | 82.5 | 76.7 | 52.5 | 0 | 0 |
| CAC | 2 | 90 | 92.5 | 82.5 | 75 | 0 |
| CAC | 4 | 100 | 97.5 | 83.8 | 81.7 | 70 |
| CAC | 9.6 | 100 | 97.5 | 96.8 | 88.5 | 80 |
| CCA | 2 | 80 | 70 | 35 | 0 | 0 |
| CCA | 4 | 80 | 70 | 75 | 0 | 0 |
| Timbor | 4 | 52.5 | 36.7 | 0 | 0 | 0 |
| Timbor | 8 | 70 | 23.3 | 0 | 0 | 0 |
| Zinc Borate | 4 | 70 | 70 | 23.3 | 0 | 0 |
| Zinc Borate | 8 | 70 | 75 | 48.8 | 0 | 0 |
| Untreated | 0 | 77 | 65.6 | 23.8 | 0 | 0 |

| | |
|---|---|
| Flake species | Aspen and Red pine |
| Flake moisture content | 100% based on oven dry weight |
| Resin | 5.5% liquid phenolic resin |
| Wax addition rate | 1% w/w |

TABLE 11

| | | |
|---|---|---|
| Mean Internal Bond (n = 21) | 54.7 psi | 37.7 N/cm$^2$ |
| Mean Water Absorption (n = 9) | 11.5% | — |
| Mean Thickness Swell (n = 9) | 5.4% | — |
| Mean MOE (n = 9) | 344,529 psi | 237,552 N/cm$^2$ |
| Mean MOR (n = 9) | 1295 psi | 893 N/cm$^2$ |

TABLE 12

| Sample | Initial thickness (mm) | Final thickness (mm) | % swelling |
|---|---|---|---|
| Untreated | 19.2 | 23.77 | 23.8 |
| CAC treated (0.6 pcf) CAC | 19.5 | 19.81 | 1.5 |

TABLE 13

Ground proximity Termite Test
12 months exposure, Hilo, HI
*Coptotermes formosanus*

| Treatment | Retention Kg/m$^3$ | Average termite rating |
|---|---|---|
| Ammoniacal copper dimethyl glyoxime | 2 | 1.5 |
| | 4 | 0.25 |
| Copper Ammonium Acetate | 4 | 0.25 |
| Untreated | 0 | 4 |

Where
0 termite rating = 100% sound
4 termite rating = completely destroyed
Number of samples = 4

TABLE 14

Ground contact performance
Hilo, HI
Copper ammonium acetate and copper dimethylglyoxime treated Aspen OSB

| | Retention | Decay rating | | |
|---|---|---|---|---|
| Treatment | (kg/m3) | 9 months | 20 months | 32 months |
| Copper ammonium acetate | 4 | 97.5 | 86.3 | 90.0 |
| Ammoniacal | 2 | 97.5 | 86.3 | 80 |

TABLE 14-continued

Ground contact performance
Hilo, HI
Copper ammonium acetate and copper dimethylglyoxime treated
Aspen OSB

| Treatment | Retention (kg/m3) | Decay rating | | |
|---|---|---|---|---|
| | | 9 months | 20 months | 32 months |
| copper dimethyl glyoxime | 4 | 100 | 93 | 86.3 |
| Untreated | 0 | 77.1 | 23.8 | 0.0 |

TABLE 15

Laboratory analysis
Internal Bond and thickness swelling properties
Copper ammonium acetate and copper dimethylglyoxime treated
Aspen OSB

| Treatment | Retention kg/m3 | Internal boil, psi (N/cm$^2$) | | Strength retention % | Thickness swell % |
|---|---|---|---|---|---|
| | | Initial | 2 hour boil | | |
| Ammoniacal copper dimethyl glyoxime | 2 | 89 (61) | 33.3 (23) | 37.4 | 25.6 |
| | 4 | 193.8 (64.7) | 37.1 (25.6) | 39.6 | 20.6 |
| Copper ammonium acetate | 4 | 77.8 (53.6) | 27 (18.6) | 34.8 | 19.9 |
| Untreated | 0 | 100.4 (69.2) | 18.4 (12.7) | 18.3 | 32.7 |

Number of samples = 4

TABLE 16

Field Swelling
Ground Proximity test
Hilo, HI

| Treatment | Retention kg/m$^3$ | Thickness swell (%) | |
|---|---|---|---|
| | | 1 month | 3 months |
| Ammoniacal copper dimethyl glyoxime | 2 | 16.4 | 33.2 |
| | 4 | 13.7 | 23.2 |
| Copper ammonium acetate | 4 | 10.4 | 19.2 |
| Untreated | 0 | 17 | 31.2 |

TABLE 17

Field swelling Soil bed ground contact test
Harrisburg, NC

| Treatment | Retention kg/m$^3$ | Thickness swell (%) | |
|---|---|---|---|
| | | 1 month | 3 months |
| Ammoniacal copper dimethyl glyoxime | 2 | 25.6 | 27.3 |
| | 4 | 23.1 | 33.6 |

TABLE 17-continued

Field swelling Soil bed ground contact test
Harrisburg, NC

| Treatment | Retention kg/m$^3$ | Thickness swell (%) | |
|---|---|---|---|
| | | 1 month | 3 months |
| Copper ammonium acetate | 4 | 23.6 | 18.8 |
| Untreated | 0 | 24.3 | 41.9 |

What is claimed is:

1. A method for making wood composites having improved dimensional stability, comprising:
   A. providing green wood particles;
   B. applying an ammoniacal stabilizer to said green wood particles in an amount effective to improve the dimensional stability of said wood;
   C. while or after applying said stabilizer, applying a water repellant material to said green wood particles to form treated green wood particles;
   D. after said applying steps, applying a binder to said treated green wood particles; and
   E. forming said treated green wood particles into a wood composite.

2. The method for making wood composites of claim 1, wherein said ammoniacal stabilizer is applied in an amount effective to provide a swelling valve that is less than that of an analogous wood composite not treated with said ammoniacal stabilizer.

3. The method for making wood composites of claim 1, wherein said green wood particles have an average length of from about 0.5 inch to about 6 inches (1 to 15 cm), an average thickness of from about 0.01 to about 0.05 inch (0.2 to 1.3 mm), and an average width of from about from about 0.1 to about 2.5 inches (2 to 64 mm).

4. The method for making wood composites of claim 1, wherein said green wood particles comprise aspen particles.

5. The method for making wood composites of claim 1, wherein said ammoniacal stabilizer comprises an ammoniacal copper wood preservative.

6. The method for making wood composites of claim 1, wherein said ammoniacal stabilizer comprises copper ammonium carbonate.

7. The method for making wood composites of claim 1, wherein said ammoniacal stabilizer comprises copper ammonium acetate.

8. The method for making wood composites of claim 1, wherein said ammoniacal stabilizer comprises ammoniacal copper arsenate.

9. The method for making wood composites of claim 1, wherein said ammoniacal stabilizer comprises an ammoniacal metal/dimethyl glyoxime.

10. The method for making wood composites of claim 1, wherein said ammoniacal stabilizer is applied in an amount effective to provide a swelling value that is less than about 75% of the swelling value of an analogous wood composite not treated with said ammoniacal stabilizer.

11. The method for making wood composites of claim 1, wherein said ammoniacal stabilizer is applied in an amount effective to provide a swelling value that is less than about 60% of the swelling value of an analogous wood composite not treated with said ammoniacal stabilizer.

12. The method for making wood composites of claim 1, wherein said ammoniacal stabilizer is applied in an amount effective to provide a swelling value that is less than about 45% of the swelling value of an analogous wood composite not treated with said ammoniacal stabilizer.

13. The method for making wood composites of claim 1, wherein said water repellant material is a paraffinic wax.

14. The method for making wood composites of claim 1, wherein said water repellant material is slack wax.

15. The method for making wood composites of claim 1, wherein said green wood particles are contacted with said ammoniacal stabilizer before being contacted with said water repellant.

16. The method for making wood composites of claim 1, wherein said green wood particles are contacted with said ammoniacal stabilizer while being contacted with said water repellant.

17. The method for making wood composites of claim 1, wherein said particles are dried after contacting them with said ammoniacal stabilizer and said water repellent.

18. The method for making wood composites of claim 1, wherein said ammoniacal stabilizer and said water repellant material are applied from a single emulsion.

19. The method for making wood composites of claim 1, wherein said ammoniacal stabilizer is applied at a level of from about 4 to about 6.5 Kg/m$^3$ of wood composite.

20. The method for making wood composites of claim 1, wherein said ammoniacal stabilizer is applied from an aqueous dispersion.

21. The method for making wood composites of claim 1, wherein said binder is a phenolic resin.

22. The method for making wood composites of claim 1, wherein said binder is a urea-formaldehyde resin.

23. The method for making wood composites of claim 1, wherein said ammoniacal stabilizer is present in an amount effective to reduce the rate of deterioration of said wood composite to less than that of an analogous wood composite not treated with said ammoniacal stabilizer.

24. The method for making wood composites of claim 1, wherein said green wood particles comprise Southern pine particles.

25. A stabilized wood composite made by the method of claim 1.

26. A method for making wood composites having improved dimensional stability, comprising:
   A. providing green wood particles;
   B. applying an ammoniacal stabilizer to said green wood particles in an amount effective to improve the dimensional stability of said wood, wherein said green wood particles have a moisture content of from about 60% to about 100%, based on dry wood weight, just before said stabilizer applying step;
   C. while or after applying said stabilizer, applying a water repellant material to said green wood particles to form treated green wood particles;
   D. after said applying steps, applying a binder to said treated green wood particles; and
   E. forming said treated green wood particles into a wood composite.

27. A method for making wood composites, comprising:
   A. providing green wood particles;
   B. applying a wood preservative to said green wood particles in an amount effective to preserve said wood, forming preserved wood particles; and
   C. forming said preserved wood particles into a wood composite.

28. The method for making wood composites of claim 27, further comprising applying a water repellant material to said preserved wood particles while or after applying said wood preservative.

29. The method for making wood composites of claim 27, further comprising applying a binder to said wood particles while or after applying said wood preservative.

30. The method for making wood composites of claim 27, wherein said wood preservative is applied to said green wood particles in an amount effective to improve the dimensional stability of said wood.

31. The method for making wood composites of claim 27, wherein said wood preservative comprises ammoniacal copper.

32. The method for making wood composites of claim 27, wherein said wood preservative comprises copper ammonium acetate.

33. The method for making wood composites of claim 27, wherein said wood preservative comprises copper ammonium carbonate.

34. The method for making wood composites of claim 27, wherein said wood preservative comprises ammoniacal copper arsenate.

35. The method for making wood composites of claim 27, wherein said wood preservative comprises an ammoniacal metal/dimethyl glyoxime.

36. The method for making wood composites of claim 27, wherein said green wood particles are contacted with said wood preservative before being contacted with said water repellant.

37. The method for making wood composites of claim 27, wherein said wood particles are flakes having an average length of from about 0.5 inch to about 6 inches (1 to 15 cm), an average thickness of from about 0.01 to about 0.05 inch (0.2 to 1.3 mm), and an average width of from about from about 0.1 to about 2.5 inches (2 to 64 mm).

38. A wood composite comprising:
   A. wood particles,
   B. a binder, and
   C. a copper ammonium acetate wood stabilizer, present in an amount effective to provide a swelling value that is less than that of an analogous wood composite not treated with said wood stabilizer.

39. A wood composite comprising:
   A. wood particles,
   B. a binder, and
   C. a copper ammonium acetate preservative, present in an amount effective to preserve said wood composite.

* * * * *